June 4, 1968    S. PLATTER ET AL    3,386,772

METHOD AND APPARATUS FOR TRANSPORTING A CLOSED TAPE LOOP

Filed Dec. 7, 1966

INVENTORS
S. PLATTER
M. J. LOWERY, Jr.

BY *Sughrue, Rothwell, Mion, Zinn & Macpeak*
ATTORNEYS

United States Patent Office 3,386,772
Patented June 4, 1968

3,386,772
METHOD AND APPARATUS FOR TRANSPORT-
ING A CLOSED TAPE LOOP
Sandford Platter, Boulder, Colo., and Michael J. Lowery,
Jr., Poughkeepsie, N.Y., assignors to International Business Machines Corporation, Armonk, N.Y., a corporation of New York
Filed Dec. 7, 1966, Ser. No. 599,749
9 Claims. (Cl. 302—2)

ABSTRACT OF THE DISCLOSURE

Apparatus for transporting a closed tape loop within a transport having a storage area and a working area comprising first pneumatic means located in said storage area for shaping said loop into a "Dog Bone" shape having bulged ends and a collapsed center portion and second pneumatic means for moving said shaped loop within said transport from said storage position to said working position.

Also the method of transporting an endless loop of magnetic tape within a transport having a bin at one end thereof in which said loop is stored comprising forming the endless loop into a "Dog Bone" shape having bulged ends and a collapsed center portion by pneumatic pressure differentials applied to selected portions of the bin with the loop therein, and moving the loop by further differential pneumatic pressures from said bin into a connecting header.

This invention relates to an improved method and apparatus for transporting an endless belt or loop of material, such as magnetic tape, within a pneumatic transport having a discontinuous or broken surface to move the loop from one portion of the pneumatic transport to another portion of the transport. The two portions of the pneumatic transport to which the loop may move are a storage position and a processing position. The discontinuous surface area may be formed by the mouths of a plurality of pockets or bins for storing similar endless loops of magnetic tape.

It has been found that when moving an endless loop of magnetic tape through a transport having a discontinuous surface that if the loop is held open due to pressure in the loop during transfer of the loop, it will fail when moving over the discontinuous portions. These discontinuous portions cause waving and folding of the loop. However, it has been discovered that by forming the loop in a particular shape with bulged ends and a collapsed center, somewhat the shape of a "Dog Bone," this failure will not occur in passage through the discontinuous portion of the transport over the bin or pocket mouths. This is because forming the loop in the "Dog Bone" shape enables it to float on a hydrodynamic bearing surface provided by the mass of air moving in the passage. This floating action gives stable motion in the discontinuous section of the transport and results in a much lower drag on the loop, thus allowing higher transport velocities for the loop with less vacuum pressure and, since the loop does not touch the walls of the transport, the wear on the loop during transport is greatly reduced.

Thus this invention is directed to method of transporting an endless loop or belt of magnetic tape within a transport having a discontinuous surface to move the loop from a storage position to a processing position in which the improvement comprises forming the endless loop into a "Dog Bone" shape, or shape having bulged ends and a collapsed center, by pneumatic pressure applied to selected portions of the bin or storage positions with the loop therein, and then moving the so-shaped loop by differential pneumatic pressure from one position in the transport over the discontinuous surface to the other position, e.g. from the storage position to the processing position and vice versa.

The invention is also directed to the apparatus for forming the loop into a "Dog Bone" shape and transporting the loop from a storage position to a processing position comprising pneumatic means for creating pressure differentials.

The foregoing and other objects, features and advantages of the invention will be apparent from the following more particular description of a preferred embodiment of the invention, as illustrated in the accompanying drawings.

Figures 1, 2:
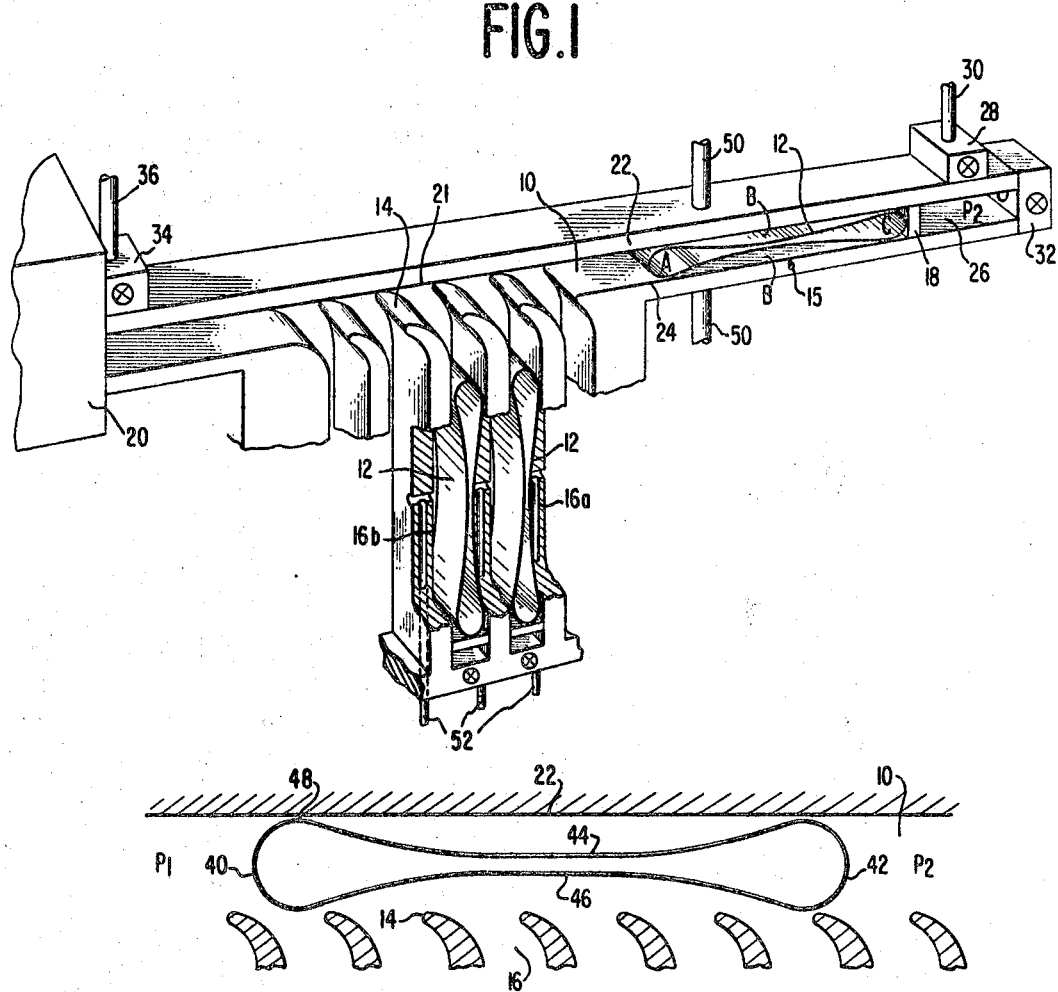
FIG. 1 is a perspective view with a side wall of a pneumatic transport removed for showing an endless loop of tape formed in a "Dog Bone" shape for movement within the transport from a storage position to a processing position.
FIG. 2 is an enlarged detail sectional view showing movement of the loop over the discontinuous portion of the transport formed by a plurality of bin mouths.

Referring to the drawings, a transport 10 is shown in FIG. 1 with a side wall removed, but it is understood that the transport would be completely closed. Positioned in the storage position is an endless loop 12 of magnetic tape of a material such as "Mylar" or other suitable polyester provided with a magnetizable coating having the usual mechanical properties of magnetic tape and approximately .001 to .002 inch in thickness. The transport 10 includes a header 21 which has a discontinuous portion formed by edges 14 of the mouths 16 of a plurality of pockets or bins 16a, 16b, etc. The bins 16a, etc. to which these mouths lead may be utilized for storing loops similar to loop 12. An additional bin 15 is optionally provided at the end of transport 10 to provide either permanent or temporary storage for a loop. The bin or pocket includes a stop 18 of aerodynamically low impedance material, i.e., a screen, at one end thereof defining a storage position for normally storing loop 12 when it is not being used or processed. Chamber 20 processes information magnetically recorded on loop 12 and can be constructed as described and claimed in U.S. patent application Ser. No. 333,918, filed Dec. 27, 1963, by P. J. Badum, H. K. Baumeister and V. Nejezchleb, entitled "Pneumatic Belt Device."

Bin 15, as noted above, is enclosed and as shown in FIG. 1 includes a top wall 22, a bottom wall 24, and in this illustrated embodiment it is connected to the end of a header 21, which is interrupted by the mouths of bins 16 to form the discontinuous portion of header 21. Behind the screen-type stop 18, there is a control chamber 26 having a vacuum valve 28 connected thereto and interposed between the chamber 26 and a vacuum line 30. The chamber 26 also has an atmospheric air valve 32. The other end of header 21 adjacent processing chamber 20 includes a vacuum valve 34 connected through line 30 to a source of vacuum (not shown). The pneumatic controls can be made as described and claimed in U.S. application Ser. No. 333,918, cited previously, or as described and claimed in U.S. application Ser. No. 362,666, filed Apr. 27, 1964, by A. Orlando, H. Baumeister and W. B. Phillips, entitled "Pneumatic Belt Device Utilizing Back-Pulsing or Forward-Pulsing," all of these applications being assigned to the same assignee as this application. In order to move the loop 12 from bin 15 shown in FIG. 1 to processing chamber 20, the vacuum valve 28 is closed, the vacuum valve 34 is opened and atmospheric valve 32 is opened causing rapid movement of the loop 12 to the end of the header 21 and into processing chamber 20. As the tape moves through header 21, it will pass over the discontinuous portion adjacent the bin mouths 16.

During its movement along header 21 and in any bin 15 or 16, the loop 12 is formed into a specific shape to facilitate its transport in the passage. This shape is shown in FIGS. 1 and 2 and includes bulged end portions 40 and 42 and collapsed center portions 44 and 46 of the loop 12. This shape is somewhat similar in shape to a dog bone, hence the term "Dog Bone" shape loop. The collapsed portions 44 and 46 may contact each other.

By virtue of the various pressures and pressure differentials air bearings will be formed at the top and bottom of each of the loop portions 40 and 42, such as air bearing 48, even when the loop is passing over the discontinuous surface at the bin mouths of FIG. 2.

Air vents 50 and 52 are positioned near the storage end of each bin 15 or 16 adjacent the center portions 44 and 46 of loop 12 when the loop is positioned against stop 18.

Thus when the loop is against the stop 18 due to the vacuum applied through line 30 and valve 28, $P_2$, the pressure at the right end of the loop as viewed in FIG. 1, is much less than ambient. The vents 50 at the top and bottom walls 22 and 24 of the bin 15 cause the pressure in regions B, B to be ambient and the pressure in loops A and C to be less than ambient when the loop is against the stop. The width of the loop is as shown in FIG. 1, substantially the width of the bin while the height of the "Dog Bone" ends of the loop are almost but slightly less than the depth of the bin to form an air bearing on both sides of the bulge at each end of the loop.

When the loop is to be moved from the storage position in bin 15 against stop 18 to the processing device 20, the pressure at $P_2$ is switched to ambient by closing valve 28 and opening atmospheric valve 32. The valve 34 is opened to reduce pressure $P_1$ well below ambient pressure $P_2$ causing movement of the loop to the left as viewed in FIGS. 1 and 2. The head and tail ends of the loops designated as regions A and C are held open due to the elastic properties of the loop material and there is no substantial change in the pressures in these regions during movement of the loop. The pressure at regions B remains substantially ambient during movement of the loop.

As can be seen, applicants have provided a unique method of shaping and transporting a loop over a discontinuous surface by forming the loop into a "Dog Bone" shape so that the loop will retain this shape and ride on air bearings during its passage along the surface. As shown in FIG. 1, a means for forming the loop into a "Dog Bone" shape is located in each bin. However, a means (not shown) for causing the loop to form itself into a "Dog Bone" shape is incorporated in the arrangement for handling the loop in the processing device 20 by bleeding sufficient air from the internal volume of the loop before moving it back along header 21.

While the invention has been particularly shown and described with reference to a preferred embodiment thereof, it will be understood by those skilled in the art that various changes in form and details may be made therein without departing from the spirit and scope of the invention.

What is claimed is:

1. A method of transporting an endless loop of magnetic tape within a transport having a header portion connecting a storage portion and a processing portion comprising holding said endless loop in said storage portion and forming said endless loop into a "Dog Bone" shaped having bulged ends and a collapsed center portion by pneumatic pressure differentials applied to selected portions of said storage portion while said loop is located within said storage portion and moving said loop by differential pneumatic pressures applied to said header at opposite ends thereof.

2. A method as defined in claim 1 wherein one of the portions of said transport is a storage bin for the loop and the other portions of said transport are a processing chamber for the loop and a connecting header, and further comprising venting the walls of the bin adjacent the storage position of the loop above and below the collapsed center portion of the loop to assist in forming the loop into the "Dog Bone" shape.

3. A method as in claim 2 further comprising selectively applying vacuum or at least atmospheric pressure to the bin beyond one end of the loop opposite the header.

4. A method as in claim 3 further comprising defining the storage position of the loop in the bin by stopping the loop with a stop having low aerodynamic impedance.

5. A method as in claim 1 further comprising providing a hydrodynamic bearing surface for the bulged portions of the loop during its movement through the header and retaining the loop in this "Dog Bone" shape by the elasticity of the loop material.

6. An apparatus for transporting an endless loop of magnetic tape within a transport having a storage portion and a processing portion connected by a header portion comprising first pneumatic means for holding said loop in the storage portion of said transport and for shaping said loop into a "Dog Bone" shape having bulged ends and a collapsed center portion and second pneumatic means for moving said shaped loop along said transport from said storage portion to said processing portion.

7. An apparatus according to claim 6 wherein said transport contains a header area with a discontinuous surface whereby said second pneumatic means moves said loop along said header.

8. An apparatus according to claim 7 where said first pneumatic means is comprised of: first vacuum port means connected at one end of a loop storage pocket, and a pair of opposed atmospheric air vent means disposed in walls positioned along the sides of said loop, whereby when a vacuum is applied to said vacuum port means the air entering said air vent means would be adapted to collapse the center portion of a tape loop disposed adjacent thereto within said cavity.

9. An apparatus according to claim 8 wherein said second pneumaic means comprises, valve means disposed adjacent said first vacuum port means adapted to connect the interior of said loop storage pocket to the atmosphere and second vacuum port means connected at the other end of said transport, whereby when a tape loop is disposed in said cavity adjacent said valve means with said valve means open and a vacuum is applied to said second vacuum port means, said tape loop will be transported from said one end of said cavity to said other end of said cavity.

References Cited
UNITED STATES PATENTS 3,314,729  4/1967  Baumeister _____ 302—2

EVON C. BLUNK, *Primary Examiner.*

H. C. HORNSBY, *Assistant Examiner.*